No. 635,116. Patented Oct. 17, 1899.
H. W. WOODHEAD.
FLAG GAME.
(Application filed Mar. 29, 1899.)
(No Model.)
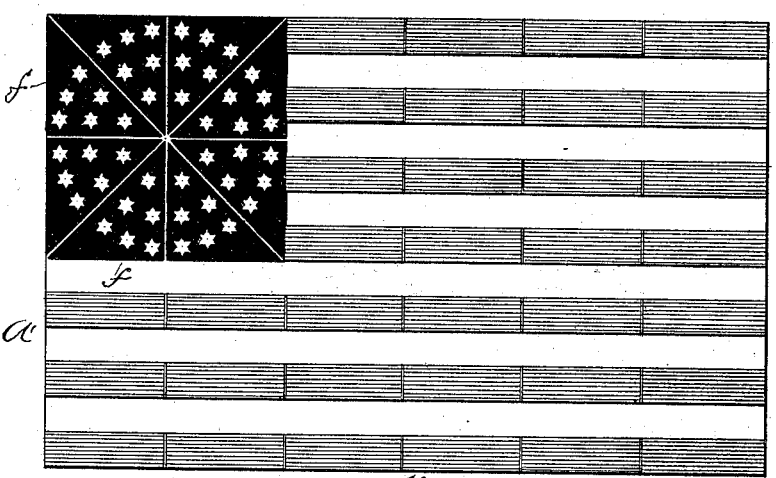 
Fig. 1. Fig. 2.
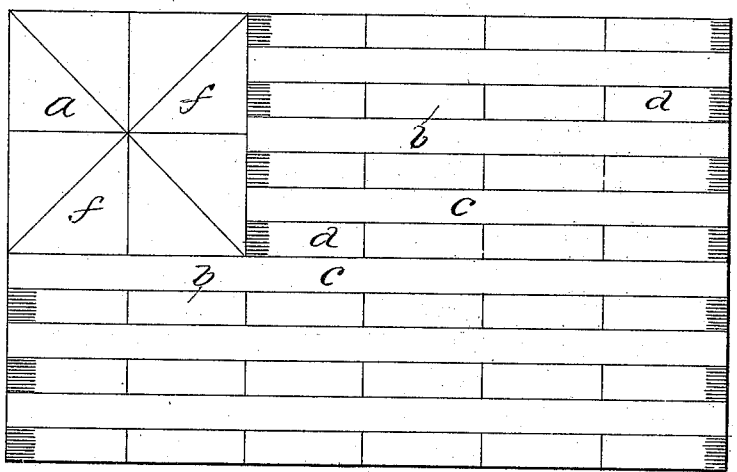
Fig. 3.
Fig. 4.
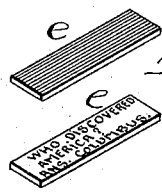
Fig. 5.
Witnesses:
Arthur G. Randall
Roy K. Kelly
Inventor:
Harry W. Woodhead
by Crossley & Goddard
Attorneys.

UNITED STATES PATENT OFFICE.

HARRY W. WOODHEAD, OF FITCHBURG, MASSACHUSETTS.

FLAG GAME.

SPECIFICATION forming part of Letters Patent No. 635,116, dated October 17, 1899.

Application filed March 29, 1899. Serial No. 710,922. (No model.)

*To all whom it may concern:*

Be it known that I, HARRY W. WOODHEAD, of Fitchburg, in the county of Worcester and State of Massachusetts, have invented certain new and useful Improvements in Flag Games, of which the following is a description sufficiently full, clear, and exact to enable those skilled in the art to which it appertains or with which it is most nearly connected to make and use the same.

This invention has relation to games of an educational character which are employed in connection with a representation of the American flag.

It is the object of the invention to provide a game which shall at once be instructive and entertaining and which shall tend to an inspiration of patriotic ideas.

To these ends the invention consists of a game-board having a diagram in the form of a United States flag inscribed thereon, with the representations of the red stripes divided into rectangular sections and the representation of the blue field divided into triangular sections, in combination with rectangular and triangular blocks corresponding to the form of the sections on the diagram, all to be employed as is hereinafter fully set forth.

Reference is to be had to the annexed drawings, and to the letters marked thereon, forming a part of this specification, the same letters designating the same parts or features, as the case may be, wherever they occur.

Of the drawings, Figure 1 is a face view of the diagram adapted to be inscribed on the game-board, with the several blocks in position on the representations of the blue field and the red stripes. Fig. 2 is an end view of the same. Fig. 3 is a plan view of a diagram without the blocks in position thereon. Fig. 4 is a view of the triangular blocks, showing the obverse and the reverse faces.

In the drawings, $a'$ designates a view of a diagram in representation of a United States flag adapted to be inscribed upon a game-board, $a$ indicating the blue field, $b$ the red stripes, and $c$ the white stripes of the flag. The red stripes $b$ are divided into sections $d$, rectangular in form.

$e$ designates blocks of a form corresponding to the sections $d$, adapted to be placed thereover and to fully cover the red stripes when a sufficient number are placed on the latter.

$f$ designates triangular sections into which the blue field is divided, and $g$ designates triangular blocks corresponding to the form of the sections $f$, into which the blue field is divided. Upon one side of the blocks $e$ and $g$ questions and answers may be printed or inscribed, the other side of the blocks being plain.

In the use of my improved game a game-board is taken by a player and a questioner having the blocks in hand may select one after another, repeating the questions thereon. For example, asking the first player "Who was the first President of the United States?" and if he should answer correctly, "Washington," the block containing the question and answer would be passed to him and he would place the same upon a square or triangle, as the case might be. Then drawing another block he would ask the next player the question upon that block, and if the player answered correctly the block would be passed to him. If not, the question would be passed to the next player, and so on until the question was answered correctly, and the player answering correctly would receive the block and place it upon a square or triangular section of the diagram, as the case might be, until all of the sections of the diagram are covered by one player, and the player first covering all of the sections of the diagram is the winner.

Of course the manner of employing the diagram and triangular blocks and sections may be varied. For instance, the answers may be printed upon the squares and triangles of a diagram and each player be supplied with a number of triangular and rectangular blocks and questions simply drawn by the questioner, so that the member having the block with the answer to the question thereon would be entitled to cover the board with a square or triangular block, as the case might be, and the player first covering all of the rectangular or triangular places will be declared the winner. However, these variations simply indicate the various ways in which my game may be used, the game consisting of a board having inscribed thereon a representation of a United States flag with the blue field divided into triangular sections and the red stripes into rectangular sections, with triangular and rectangular blocks corresponding in form to the sections inscribed on the diagram.

Having thus explained the nature of the invention and described a way of constructing and using the same, though without attempting to set forth all of the forms in which it may be made or all of the modes of its use, it is declared that what is claimed is—

A game consisting of a board having a diagram in representation of a United States flag inscribed thereon, with the red stripes divided into rectangular sectional divisions and the blue field divided into triangular sectional divisions, and rectangular and triangular blocks corresponding to the sectional divisions and adapted to be placed thereon as the game is played.

In testimony whereof I have signed my name to this specification, in the presence of two subscribing witnesses, this 14th day of March, A. D. 1899.

HARRY W. WOODHEAD.

Witnesses:
ARTHUR W. CROSSLEY,
CHAS. E. KIRBY.